(12) United States Patent
Sebata et al.

(10) Patent No.: US 6,401,628 B1
(45) Date of Patent: Jun. 11, 2002

(54) RAILWAY VEHICLE

(75) Inventors: Michio Sebata; Toshiaki Makino; Motomi Hiraishi; Minoru Nakamura, all of Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/564,797

(22) Filed: May 5, 2000

(30) Foreign Application Priority Data

May 20, 1999 (JP) ............................................. 11-139672
Sep. 24, 1999 (JP) ............................................. 11-269853
Feb. 1, 2000 (JP) ............................................. 12-028888

(51) Int. Cl.⁷ ................................................. B61F 5/50
(52) U.S. Cl. ............................. 105/199.1; 105/199.2; 105/176; 105/194
(58) Field of Search ........................... 105/199.1, 199.2, 105/176, 194

(56) References Cited

U.S. PATENT DOCUMENTS

| | | | |
|---|---|---|---|
| 3,547,045 A | * 12/1970 | James | ........................ 105/199 |
| 4,744,604 A | 5/1988 | Lewis et al. | |
| 5,086,706 A | * 2/1992 | Boivin | ........................ 105/168 |
| 5,690,034 A | * 11/1997 | Schahl et al. | ............ 105/199.1 |
| 5,775,049 A | 7/1998 | Fricke | |

FOREIGN PATENT DOCUMENTS

| | | | | |
|---|---|---|---|---|
| DE | 2533088 | 2/1977 | | |
| GB | 0357564 A2 | * 3/1990 | ............ | B61C/9/44 |
| JP | 4-77092 A1 | * 4/1992 | | |
| JP | 477092 | 7/1992 | | |
| SE | 1017852 A | * 5/1983 | | |
| SU | 1017852 | 5/1983 | | |
| WO | WO-85/05425 A1 | * 5/1984 | | |
| WO | 8505425 | 12/1985 | | |
| WO | 9721576 | 6/1997 | | |

* cited by examiner

Primary Examiner—S. Joseph Morano
Assistant Examiner—Frantz F. Jules
(74) Attorney, Agent, or Firm—Antonelli, Terry, Stout & Kraus, LLP

(57) ABSTRACT

On an outer periphery of a link 30 for connecting a member car body 20 and a bogie car frame 11, vessel is provided and 42 into which particle shaped members 41 are inserted. A rotation vibration generated from a drive system of a running electric motor 14, a transmission apparatus and a shaft coupling is transmitted to the link 30. The vibration energy generated at link 30 is converted to the kinetic energy in response to the collision of the particle-shaped members 41 contained in the vessel 42 so that the vibration at the link 30 is reduced. Accordingly, the propagation of the vibration to a car body can be restrained. The particle-shaped members 41 can be inserted into a cylindrical portion 31 of the link 30. Further, the particle-shaped members 41 can be inserted movably into a column 32. In a railway vehicle having a bogie car, the vibration caused by the unbalance of the drive system can be restrained and the noise in a car accompanied with the vibration can be reduced.

31 Claims, 17 Drawing Sheets

RAILWAY VEHICLE

BACKGROUND OF THE INVENTION

The present invention relates to a railway vehicle; and, more particularly, the invention relates to a railway vehicle which employs a bogie car. The term "railway vehicle" refers to a vehicle which runs on a track.

As described in Japanese application utility model publication No. Sho 58-1406, a bogie car frame and a car body of a railway vehicle are connected with a traction link (hereinafter, simply called a "link"). At both ends of the link, namely in a forward and backward direction, a rubber bush is arranged. The rubber bush is designed to fully support a compression load which occurs sometimes in the forward direction and backward direction. Also, the rubber bush is used to provide running stability. In addition, the bogie car and the car body are connected by a yaw damper.

Further, a sound shielding panel using a particle-shaped member is disclosed in Japanese application patent laid-open No. Hei 10-266388. Regarding this sound shielding panel, the floor of a car body is provided in the form of an aluminum honeycomb panel, and, in an interior portion of the panel, powders having a particle size of 30 $\mu$m–1000 $\mu$m are provided, so that a damping of sound in an up and down direction at the floor of the car body is carried out.

A vibration in the forward direction and backward direction (relative to the running direction of the vehicle) which is generated at a bogie car side is transmitted to the two rubber bushes at the respective ends of the link, as well as through a connection portion of the yaw damper. For this reason, the noise level in the car becomes high. In particular, a solid propagation vibration having a rotation frequency component in the 80–300 Hz band area is transmitted to the bogie car and this vibration operates to vibrate the floor. Accordingly, there is a problem in that this causes an increase of the noise level in the car.

In the rotation vibration generated by an unbalance in the drive system, a noise component having a size less than 10 m/s$^2$ from one time to three times the rotation vibration component fl of an electric motor shaft is comparatively remarkable. These rotation vibration components fl-3 fl are transmitted as a solid propagation vibration to the car body through the link, and they produce the up and down vibration of the floor of the car body, which produce noise in the car.

In particular, during an acceleration time in the car running, a two times component 2 fl is generated in the forward direction and backward direction, in the right direction and left direction, and in the upper direction and lower direction; in particular, the vibration in the forward direction and backward direction contributes to an increase in the noise level in the car. Further, during a deceleration time and a coasting time, the increase in the forward vibration and backward vibration of the component fl and three times the component 3 fl occurs remarkably. For example, when fl is 80 Hz, 2 fl is 160 Hz, and 3 fl is 240 Hz. For this reason, it is required to reduce the vibration by about more than 100 Hz.

SUMMARY OF THE INVENTION

An object of the present invention is to reduce the noise in a car by a simple construction.

The above-stated object can be attained by providing a connection member between one part of a car body and another part of the car body, or a connection body between the car body and a bogie car frame, in the form of a vessel which carries a substance which is able to move relative to the connection member. The connection members are a traction link, a yaw damper, a right and a left movement damper, provided between the car bodies ahead of and behind the damper, a bolster anchor etc.

According to the present invention, vibration energy generated at the connection member is changed to kinetic energy of the above-stated body by a collision of the above-stated substance, whereby a vibration of the connection member is reduced. For this reason, a propagation of the vibration to the car body can be restrained and the noise in the car can be reduced.

The noise in the car is generated in large part by the vibration of the floor surface of the car body. One vibration source is a rotation unbalance of the drive system of the car body. The above-stated connection member is arranged between the vibration source and the floor surface of the car body and mainly vibrates in the forward direction and back direction. For this reason, the above-stated substance in an interior portion of the connection member moves in the forward direction and backward direction. For this reason, in the movement of the substance, since it is unlikely to have a vibration of 10 m/s$^2$ which goes against gravity, the substance moves actively relative to a small excitation force. Accordingly, the vibration source of the floor surface of the car body can be restrained, and the noise in the car can be reduced.

Since the connection member is of comparatively light weight, the vibration can be restrained by a simple apparatus.

DESCRIPTION OF THE INVENTION

Figure 5:
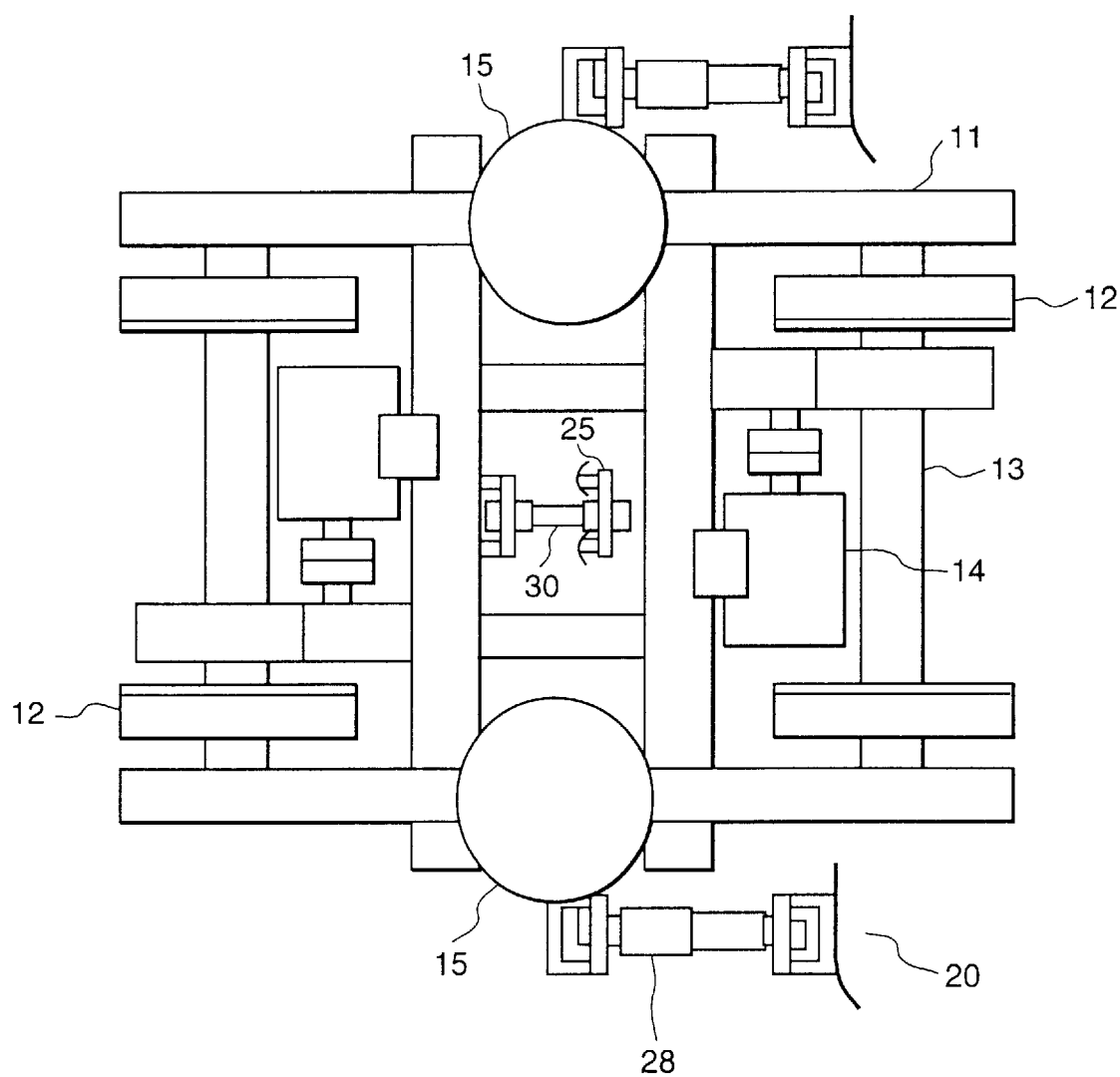
FIG. 5 is a top plan view showing a bogie car to which one embodiment according to the present invention is applied.
Figure 6:
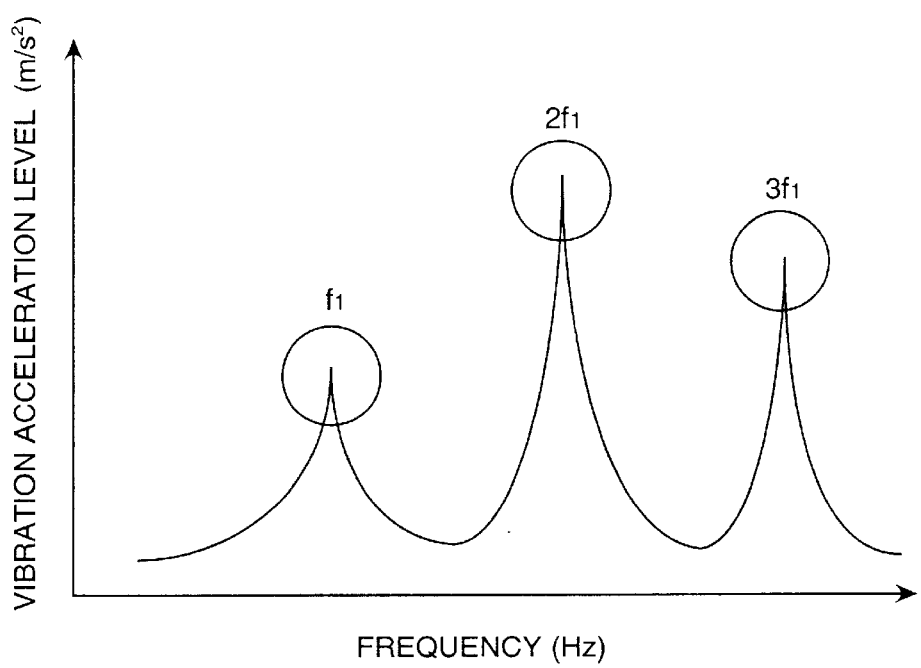
FIG. 6 is graph showing a vibration characteristic of the bogie car.

One embodiment of a railway vehicle using a bogie car according to the present invention will be explained with reference to FIG. 1 to FIG. 5. Referring first to FIG. 5, a bogie car frame 11 of a bogie car is supported by a bogie having two car axles 13, each carrying two car wheels 12, and the bogie supports a drive system which comprises an electric motor 14 for driving the wheel axles 13 and a transmission mechanism of plural gears. The bogie car frame 11 supports a car body 20 through air spring members 15.

A connection member 25 (generally called "a center pin"), which projects at a lower portion from a lower face of the car body 20, and the bogie car frame 11 are connected by a traction link 30 (herein simply called a "link"). The link 30 transmits forward and backward forces and is arranged to extend in the horizontal direction along the running direction of the car.

End portions of a right and a left side of the bogie car frame 11 are connected to the car body 20 through yaw dampers 28. Respective end portions of the yaw damper 28 are connected to the bogie car frame 11 and the car body 20 through a rubber bushing similar to that of the link 30. The yaw damper 28 prevents meandering movements during the running of the car. Further, right and left movement dampers (not shown in figure) for preventing right and left direction vibrations of the car body 20 are installed between the car body 20 and the bogie car frame 11.

Figure 1:
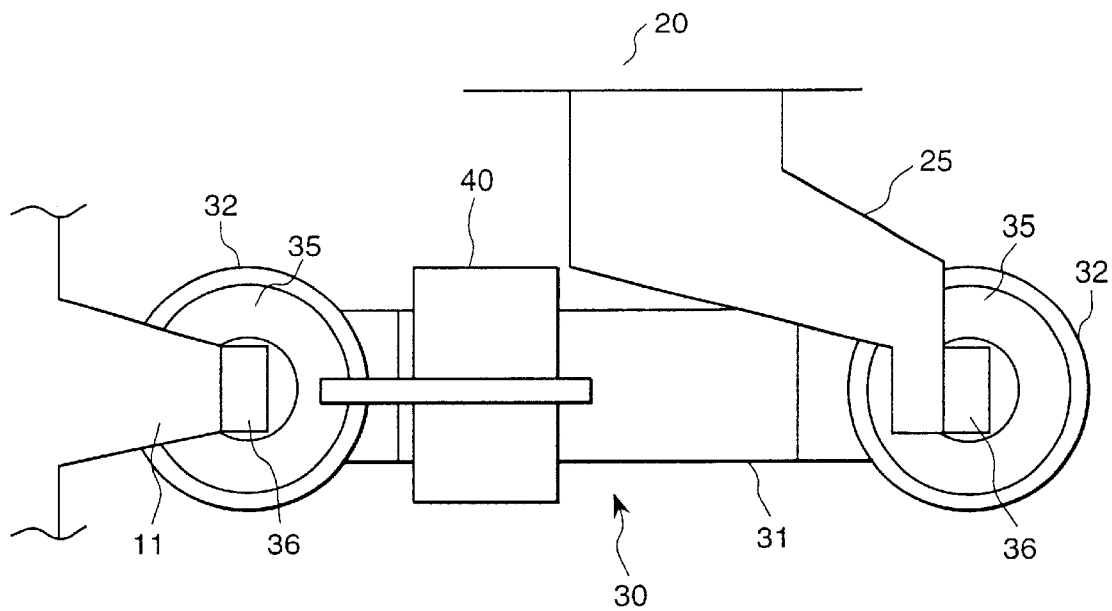
FIG. 1 is a side view showing a traction link representing one embodiment according to the present invention.
Figure 2:
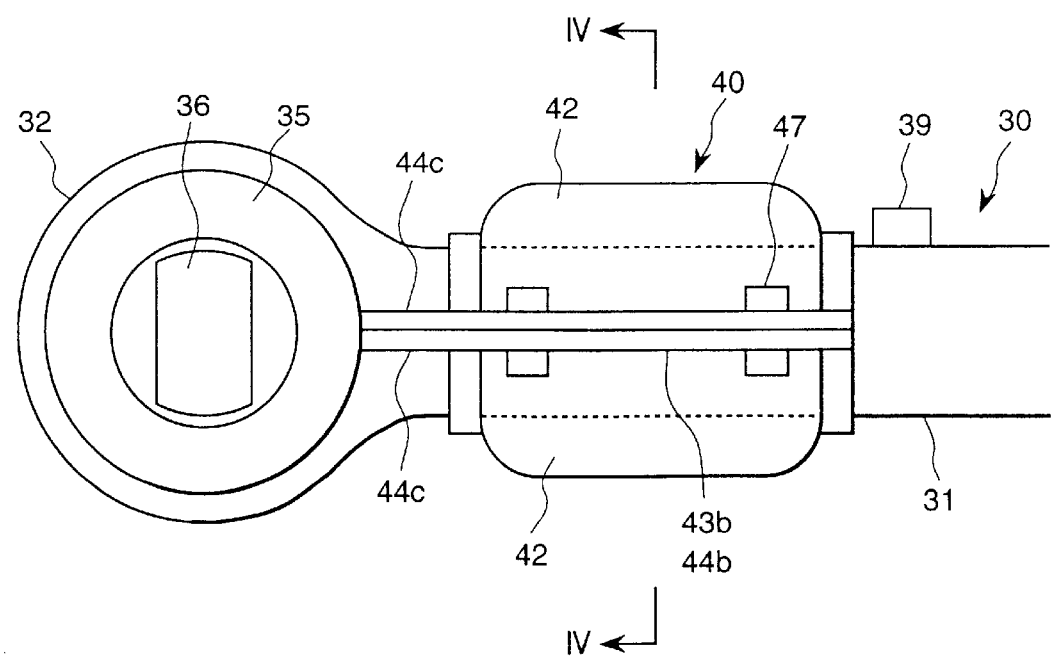
FIG. 2 is an enlarged view of an essential portion of FIG. 1.
Figure 3:
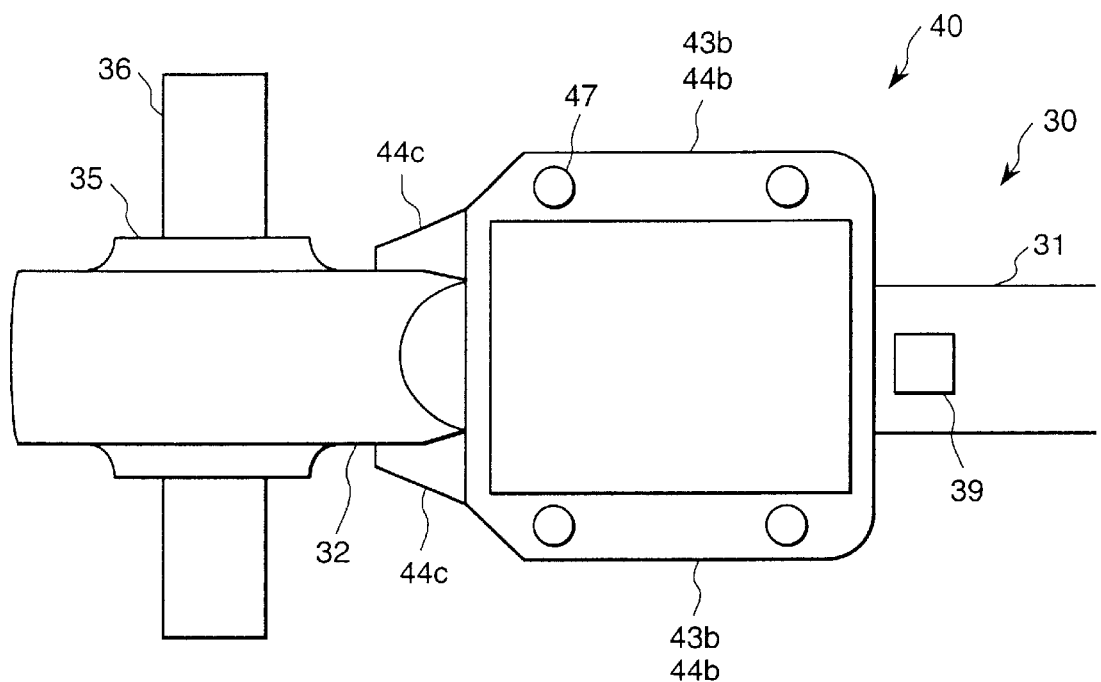
FIG. 3 is a top plan view of FIG. 2.
Figure 4:
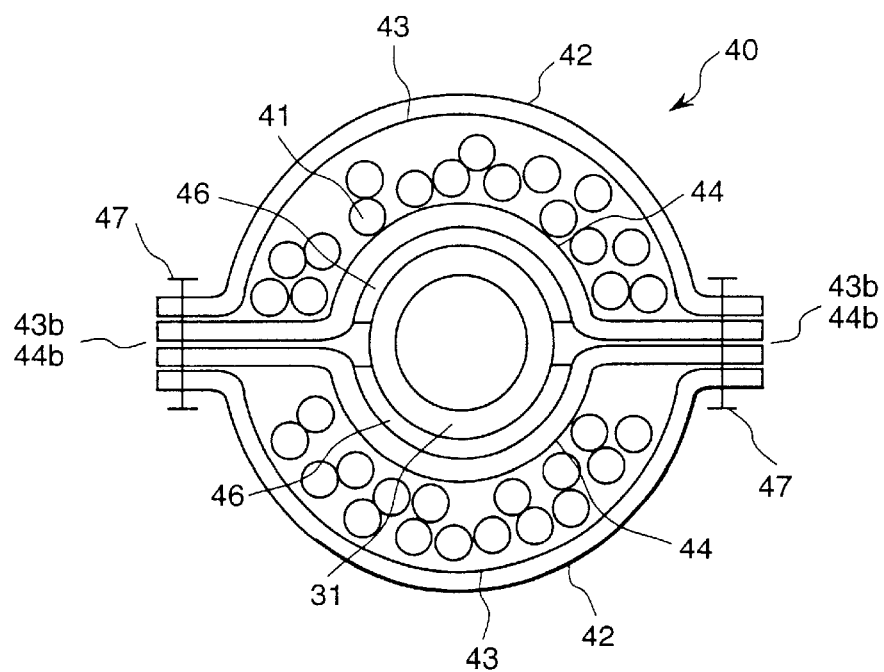
FIG. 4 is a sectional view taken along line IV—IV in FIG. 2.

The respective end portions of the link 30 are connected to the bogie car 11 and to the connection member 25 through a respective rubber bushing 35 and a pin 36, etc, as seen in FIG. 1. The connection member 25 has an inclined portion for effecting connection between the car body 20 and the link 30. A cross-section of a lower end portion of the connection member 25 is in the forward in a reversed U-shape. The inclined portion extends forward in the running direction of the car body 20. The link 30 is arranged horizontally and extends into the U-shaped portion. The center portion of the link 30 is a longitudinal cylindrical portion 31.

Since the vibration of a drive system of the electric motor 14, the transmission mechanism thereof and the coupling shaft is transmitted to the car body 20 through the link 30, an example in which a vibration countermeasure is performed with respect to the link 30 will be explained.

At an outer periphery of the cylindrical portion 31 of the link 30 at a side connected to the bogie car frame 11, a damping apparatus 40 is installed. Since at the side of the link 30 connected to the car body 20 the connection member 25 is provided, the damping apparatus 40 is not installed at that location.

The damping apparatus 40 is formed mainly of a vessel 40 which contains particle-shaped members (a particle-shaped substance) 41. The vessel 42 is divided into two parts, including an upper portion and a lower portion. The divided vessel 42, which is formed by the upper portion and the lower portion, comprises a pair of hemispherical vessels which are formed by a pair of outer side plates 43 each having a semi-circular shape in cross-section and a pair of inner side plates 44 each having a semi-circular shape in cross-section. The inner side plates 44 form the inside of the vessel and the outer side plates 43 form the outside of the vessel. After the particle-shapes members 41 are inserted into the vessel, the plate 43 mounted on the plate 44, and the four plates 43 and 44 are spot-welded at horizontal flanges 43b and 44b so that the plates 43 and 44 are integrated into one body, whereby the vessel 42 is constituted. To a combined face of the plates 43 and 44, a sealing agent is coated to shield against water and the flanges 43b and 44b are spot-welded. The individual plates 43 and 44 are manufactured by a press processing etc.

Further, in place of the spot welding, the flanges 43b and 44b may be welded around their entire periphery, whereby the sealing agent can be abolished. Further, an insertion hole may be provided to enable insertion of the particle-shaped members 41 from the outside.

To an arc-shaped inner face of the inner side plate 44, a rubber sheet 46 is adhered. The flanges 43b and 44b which are arranged in an axial direction of the link 30 are connected by a bolt-nut 47 fastener to fix the damping apparatus 40 to an outer face of the link 30. The outer face of the link 30 has a circular shape. The diameter of the semi-circular inner side of the inner side plate 44 is determined on the basis of the diameter of the link 30.

To the outer side plate (the vessel) 43, in a condition in which the particle-shaped members 41 having a predetermined weight have been inserted, the inner side plate 44 is overlapped with and covered by the outside plate 43 and the flanges 43b and 44b are fastened together by spot welding.

The end portions 44c, at the side of the bogie car frame 11, of the inner side plates 44 have projections which extend along opposing flat portions of a coupling portion of the coupling 32 of the end portion of the link 30. An end portion of the link 30 has an enlarged portion having a circular opening of large diameter into which the rubber bushing 35 is inserted. An end face of the coupling 32 in an insertion direction (an axial direction) of the rubber bushing 35 and the pin 36 is provided as a flat face. The projections on the end portions 44c extend along the flat face on either side of the coupling 32. For this reason, even when the clamping force of the bolt-nut fastener 47 is small, the damping apparatus 40 will not rotate around the link 30.

Further, to prevent movement in the axial direction of the link 30, on the outer face of the cylindrical portion 31, a fixing chip 39 is welded. A base portion of the projections 44c is positioned in the vicinity of the coupling 32, which prevents movement of the damping apparatus 40 toward the coupling 32.

The particle-shaped members 41 are made in the form of a spherical body using a ferro based or a lead based material. The particle size is 0.1 mm–10 mm. When the fill-up density of the particle-shaped members 41 is small, then attenuation effect is small; however, when the particle shape is large, the movement of the particle-shaped members 41 becomes bad, and then the vibration reduction effect can be lessened. A fill-up density of 70–95% is preferable.

The fill-up density will be explained. For example, when particle-shaped members 41 having a particle diameter of 1 mm are used, the particle-shaped members are introduced into the vessel until the vessel is fully filled, and the weight at this time is measured. This condition represents a fill-up density of 100%. A fill-up density-of 70% represents an insertion condition in which the amount of particle-shaped members 41 filled into the vessel comprises 70% by weight ratio of the weight obtained with the fill-up density of 100%.

Further, to carry out a rust prevention and corrosion prevention or abrasion prevention, an absorption material (for example, a red ocher) can be enclosed in the vessel.

As the weight ratio of the particle-shaped members 41 becomes larger, the damping effect becomes larger in proportion thereto, and so it is preferable to prepare the particle-shaped material so as to have a large specific gravity, for example, it is preferable to use lead based material. The lead based material is comparatively cheap. When the specific gravity is large, the size of the vessel for receiving the particle-shaped members 41 can be formed so as to be small. Further, when the diameter of the particle-shaped members 41 is small, it invites a high cost, and so, in general, a diameter of 1 mm is preferable. When the diameter of the particle-shaped members 41 is small, the fill-up density becomes large, making it possible to make the vessel small.

With the construction stated above, when the link 30 vibrates in response to the vibration of the drive system, the particle-shaped members 41 vibrate. As a result of the collision of the particle-shaped members 41 with each other and with the plates 43 and 44 (since the plates are formed as one body with the link 30) the friction resistance of the particle-shaped members 41 increases. For this reason, the vibration in the damping apparatus 40 is reduced, and the vibration in the link 30 is absorbed. Further, in proportion to the increase in the specific gravity, the vibration energy of the link 30 during the collision time is converted to a kinetic energy of the particle-shaped members 41 with a good efficiency.

Accordingly, the vibration energy becomes small and the vibration of the link 30 can be reduced. In particular, with respect to the vibration of the drive system, since the movement in the forward and backward directions of the particle-shaped members 41 in the interior portion of the damping apparatus 40 is unnecessary to go against (it is unnecessary to consider a vibration of more than 10 m/s$^2$), in response to the small excitation force, it can be active. For this reason, the vibration in the forward and backward directions which is solid-propagated to the car body side from the link 30 can be reduced. Accordingly, the vibration in the upper and lower directions on the floor face of the car body is reduced, and the noise in the car which radiates from the floor face can be reduced.

Namely, against a 2 fl vibration component which is comparatively remarkable during the acceleration time, by the forward and backward vibrations which solid propagate through the link 30, the particle-shaped members 41 repeatedly collide with each other in a minute range. For this reason, the vibration energy generated in the link 30 is converted to kinetic energy. Further, by the friction resistance of the particle-shaped members, the vibration is reduced. Accordingly, the vibration at the link 30 can be reduced.

In comparison with the case where a powder type material is installed in the floor of the car body 20, the reduction of the vibration in the forward and backward directions of the link 30, which is a transmission route before the vibration to the floor of the car body 20 is diffused at the floor of the car body 20, has a big effect. With respect to the vibration in the forward and backward directions, even against a small excitation force, the particle-shaped members 41 move actively (it is unnecessary to consider a vibration of more than 10 m/s$^2$ which goes against the force of gravity). Accordingly, since the forward and backward vibration at the link 30 is restrained, the increase in the up and down vibration on the floor of the car body 20 can be restrained, and the noise in the car can be reduced. Further, since the link 30 has a comparative light weight, the vibration can be reduced due to the use of a light weight apparatus.

Further, during the acceleration and deceleration running time and the coasting running time, since the vibration in the forward and backward directions at the link portion 30 increases further, the damping effect can be even more remarkable. The movement of the particle-shaped members 41 in this case, against a large excitation force, is even more active, and so the damping effect can be increased.

The damping effect of the particle-shaped members 41 as determined in an element test is shown in FIG. 7 to FIG. 11. In this element test, the pins 36 at both ends of the link 30 were fixed to a tool, and when one end of the pin 36 was excited a dynamo-electric type vibration exciter, the vibration transmissibility in the cylindrical portion 31 of the link 30 was measured. The link 30 was one used in an actual product, and to both ends of the link 30, pins 36 are mounted through rubber bushes 35, as seen in FIG. 1. The pin 36 at one end was connected to the dynamo-electric type vibration exciter. A vibration measurement device was installed to an output portion of the dynamo-electric type vibration exciter and the cylindrical portion 31 of the link 30. The vibration transmissibility, which was the quantity measured, is a ratio of the vibration acceleration of the link 30 relative to the vibration acceleration at a side of the vibration exciter.

In FIG. 7 to FIG. 11, the label "excitation (small)" indicates a case in which the excitation vibration width is 0.1 m/s$^2$, the label "excitation (middle)" indicates a case in which the excitation vibration width is 0.25 m/s$_2$ and the level "excitation (large)" indicates a case in which the excitation vibration width is 0.5 m/s$^2$. The "excitation (small)", the "excitation (middle", and the "excitation (large)" were cases where the damping apparatus according to the present invention was installed. The label "link (only)" indicates a case of the link 30 according to the prior art, and the excitation vibration width was 0.5 m/s². In the case of the link 30 according to the prior art, when the excitation vibration width is changed to the above-stated "excitation (middle)" level, and the above-stated "excitation (large)" level, the vibration transmissibility characteristic is similar to that of 0.5 m/s².

The particle-shaped members 41 of the damping apparatus 40 is a lead based system and the particle size is 1 mm, and the weight ratio relative to the link 30 (the rubber bush and the pin are included) is 28%, while the fill-up density is about 95%.

Figure 7:
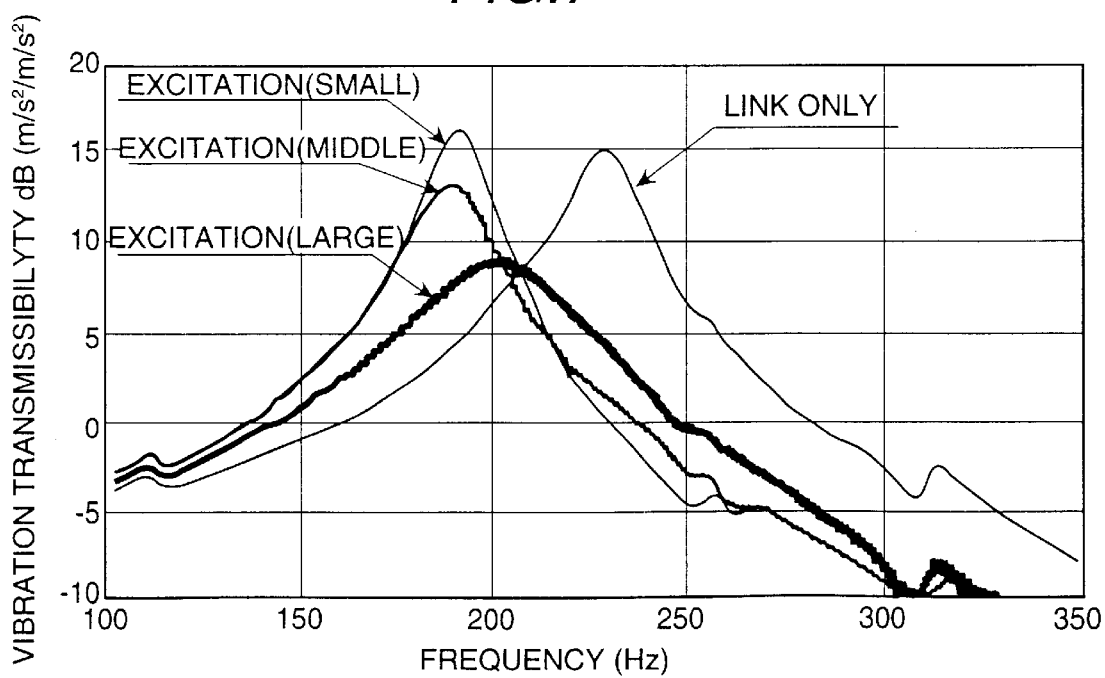
FIG. 7 is a graph showing an effect of one embodiment according to the present invention.
Figure 8:
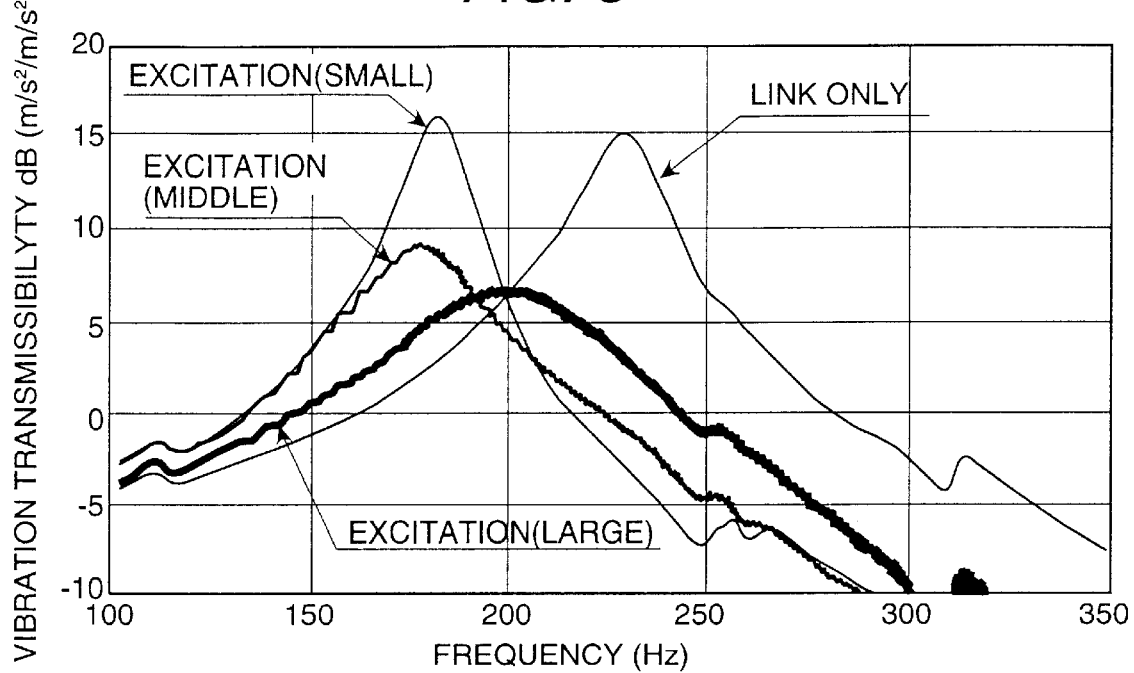
FIG. 8 is a graph showing an effect of another embodiment according to the present invention.

In FIG. 7 and FIG. 8, the damping apparatus 40 is provided on the outer peripheral portion of the link 30, but the rubber sheet 46 is not provided. The damping apparatus is not the damping apparatus itself In FIG. 7, when the excitation vibration width is small, the peak frequency of the link 30 is lowered about 40 Hz due to the weight increase of the particle-shaped member 41, etc. When the excitation vibration width is increased, the peak frequency approaches the original frequency, however the vibration transmissibility ratio is reduced. A damping effect above the 200 Hz band of about −6 dB can be obtained, when the excitation vibration width is large.

FIG. 8 shows a case where, in addition to the damping apparatus which is installed on the outside portion of the link 30, as in the case of FIG. 7, the cylindrical portion 31 of the link 30 has particle-shaped members 41 enclosed therein. The coupling 32 fixed at the both ends of the cylindrical portion 31 is welded to the link 30. The cylindrical portion 31, namely the link 30 forms a vessel. The particle-shaped members 41 are similar to those of the case shown in FIG. 7. The fill-up density is similar to that of the case shown in FIG. 7. The weight ratio of the inner and the outer particle-shaped members 41 relative to the link 30 is 44%. Accordingly, with this construction, the more the weight ratio of the particle-shaped members 41 increases, the more the-damping effect increases.

Next, referring to FIG. 9 and FIG. 10, the effect of the rubber sheet 46 will be explained. Since the plates 44 of the damping apparatus 40 are fixed to the link 30 through the rubber sheet 46, the vessel 42 is dynamically supported in a vibration absorbing manner, so that the damping effect of the link 30 is increased.

Figure 9:
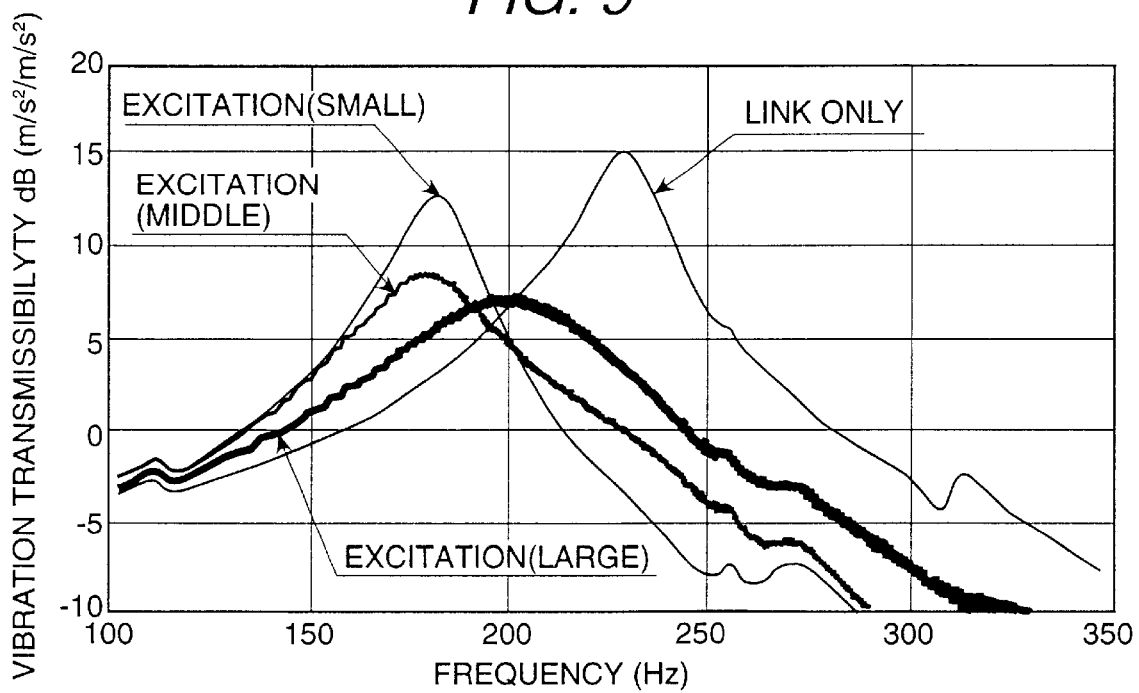
FIG. 9 is a graph showing an effect of a further embodiment according to the present invention.
Figure 10:
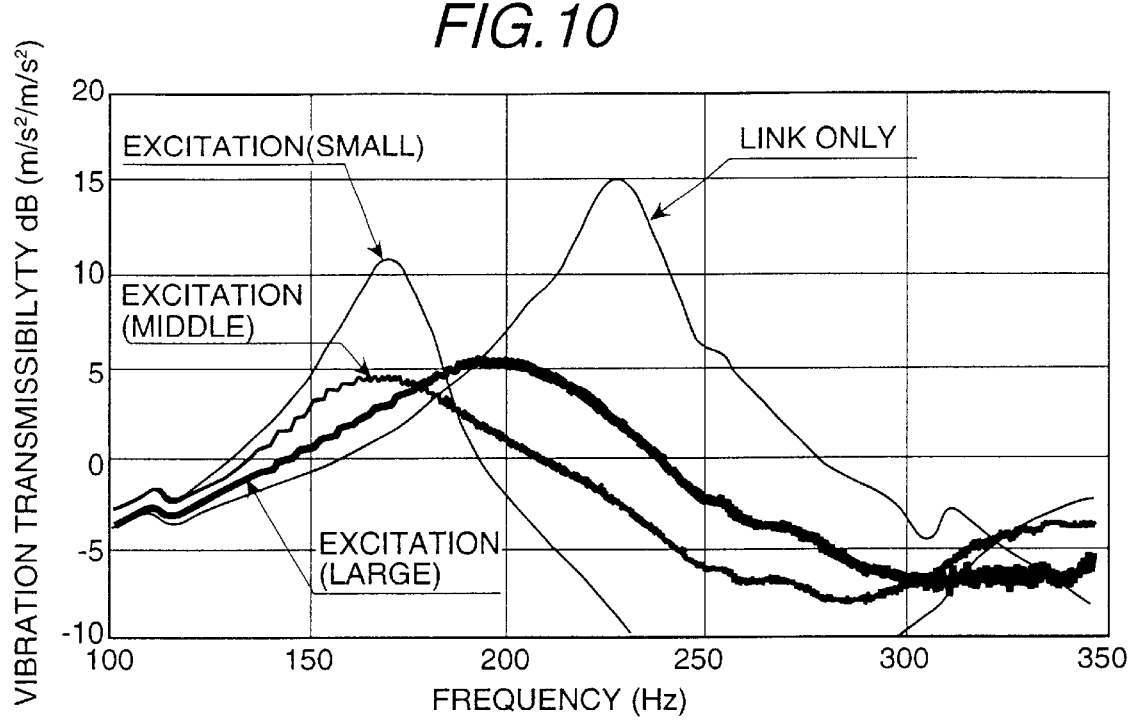
FIG. 10 is a graph showing an effect of a further embodiment according to the present invention.

FIG. 9 shows a case in which the thickness of the rubber sheet 46 is 3 mm, and FIG. 10 shows a case in which the thickness of the rubber sheet 46 is 1 mm. In both cases, the damping apparatus construction is similar to that of FIG. 7. With this construction, when the thickness of the rubber sheet 45 is 3 mm, a damping effect of about −7 dB can be obtained, and when the thickness of the rubber sheet 45 is 1 mm, a damping effect of about −9 dB can be obtained.

Figure 11:
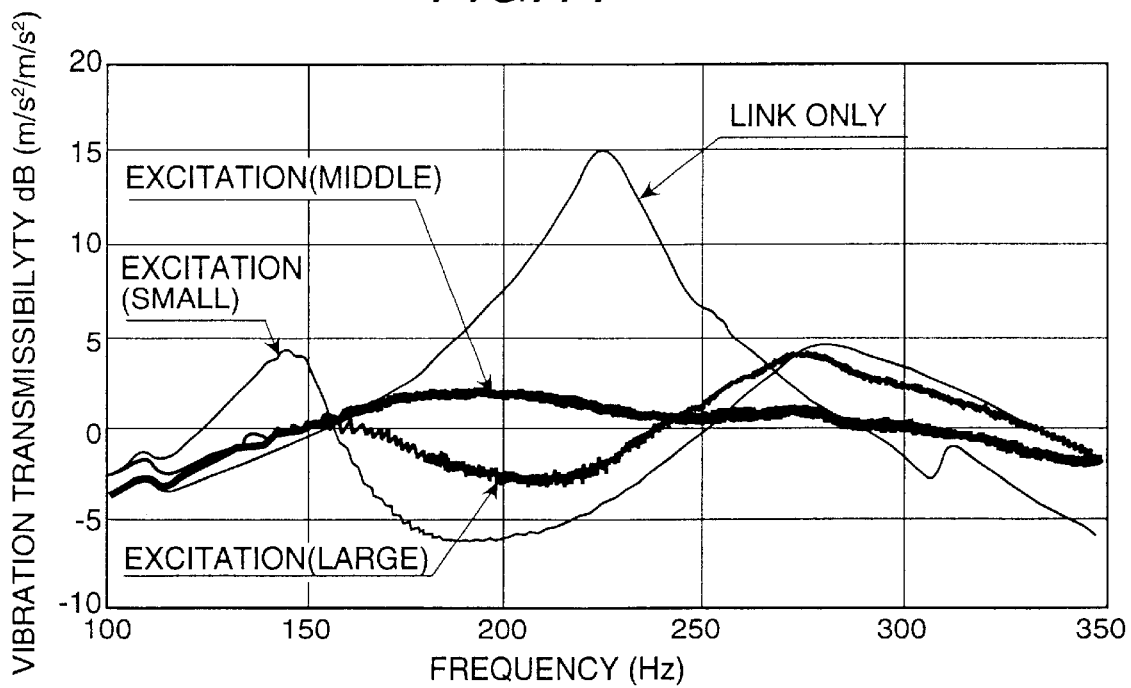
FIG. 11 is a graph showing an effect of a further embodiment according to the present invention.

Referring to FIG. 11, the effect of the fastening force of the rubber sheet 46 will be explained. In this case, in comparison with that shown in FIG. 10, the fastening force is as if the bolt-nut fastener 47 is unfastened. However, the damping apparatus does not move easily in the rotation direction and the axial direction. The thickness of the rubber sheet 46 is 1 mm. With this construction, in a range in which the frequency is about 175 Hz to about 270 Hz, the vibration transmissibility ratio is reduced. The reason for this is that by intervening the rubber sheet 46, due to the friction resistance generated on the face of the rubber sheet 46, the damping effect according to the friction increases.

In view of the above, it is preferable to form rubber sheet 46 in plural layers. For example, when the rubber sheet 46 is made of three layers, in the case of FIG. 9, a damping effect of −2 dB can be obtained.

Figure 12:
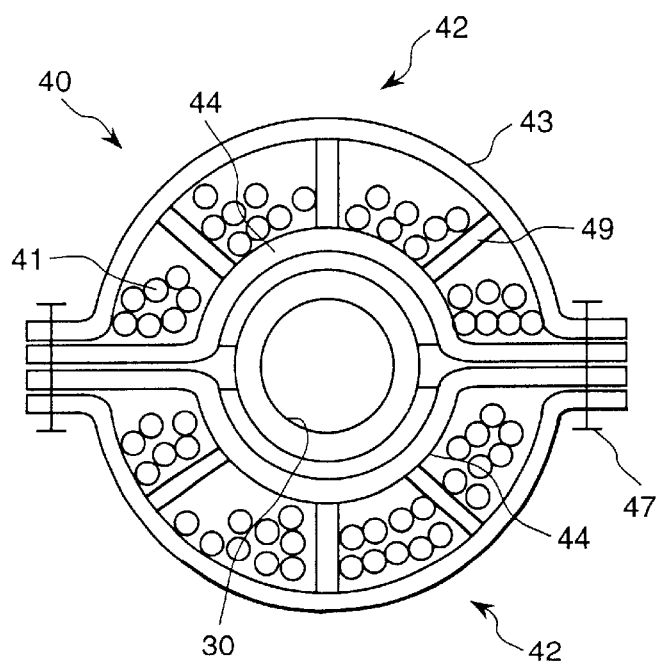
FIG. 12 is a cross-sectional view showing a damping apparatus of another embodiment according to the present invention.

An embodiment shown in FIG. 12 will be explained, In this embodiment, the space in the vessel occupied by the particle-shaped members 41 is partitioned by one or more partition plates 49. Each partition plate 49 is fixed to the inner side plate 44. With this construction, by the provision of the partition plates 49, the collision area with the particle-shaped members 41 increases and a further damping effect can be obtained.

Figure 13:
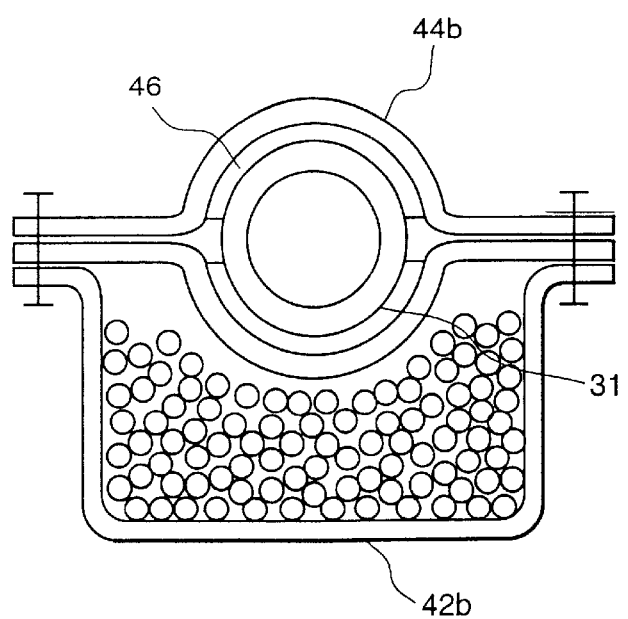
FIG. 13 is a cross-sectional view showing a damping apparatus of a further embodiment according to the present invention.
Figure 14:
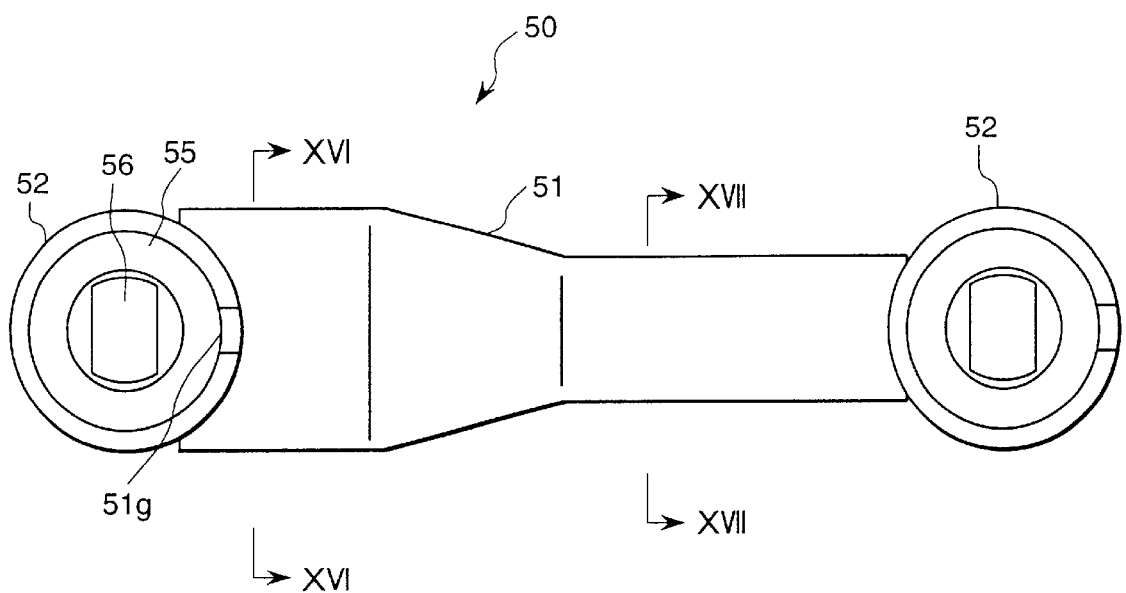
FIG. 14 is a side view of a traction link of another embodiment according to the present invention.
Figure 15:
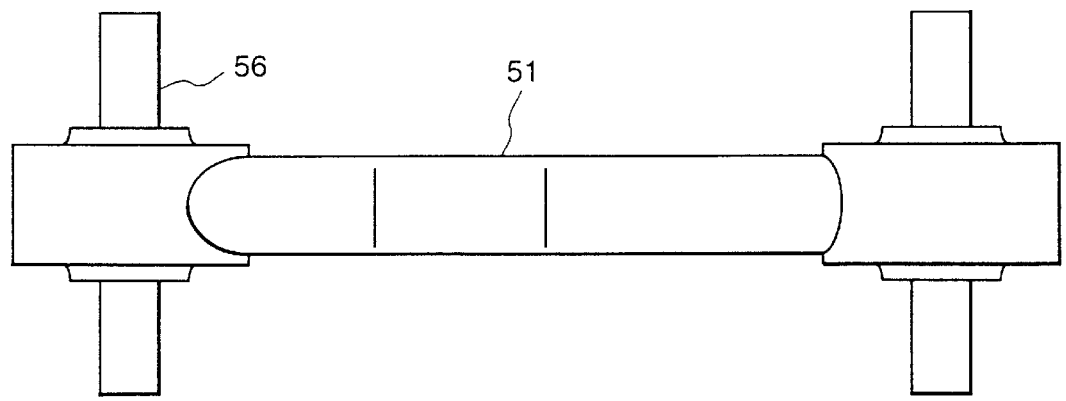
FIG. 15 is a top plan view of FIG. 14.
Figure 16:
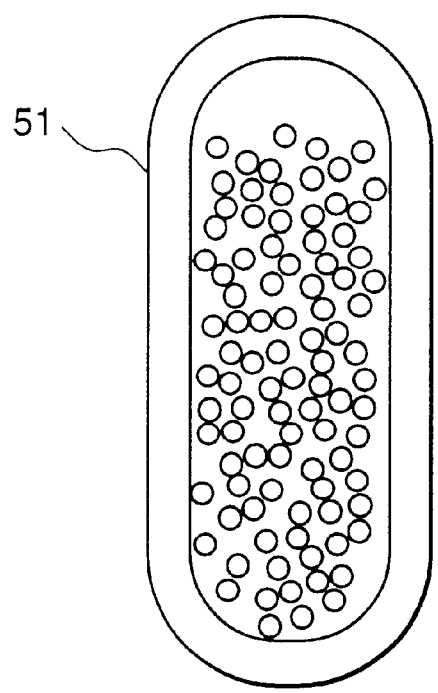
FIG. 16 is a section view taken along line XVI—XVI in FIG. 14.
Figure 17:
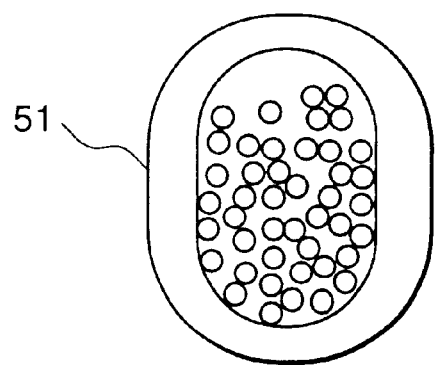
FIG. 17 is a sectional view taken along line XVII—XVII in FIG. 14.

An embodiment shown in FIG. 13 will be explained. A vessel 42b is installed only below the link 30. The cylindrical portion 31 is sandwiched by plates which correspond to the inner side plates 44 of the inner vessel 42, and the lower vessel 42b is suspended therebelow.

Embodiments shown from FIG. 14 to FIG. 17 will be explained. The outer dimension of the cylindrical portion 51 of the link 50 at the bogie car frame 11 side is large in comparison with that of the connection member 25 side. In the connection member 25 side of the cylindrical portion 51, the outer dimension is small so as not to interfere with the connection member 25. In longitudinal cross-section, the cylindrical portion 51 has an elliptical shape.

The cylindrical portion 51 is a hollow body formed by welding plates which have been bent in half using a press machine. On the other hand, all portions in which a cross-section is changed in a longitudinal direction may be joined and welded together. To both ends, respective ring-shaped couplings 52 for inserting, under pressure, the rubber bushings 55, are welded. After the coupling 52 at one end has been welded, the particle-shaped members 41 are inserted into the hollow internal chamber of the cylindrical portion 51, and next, the coupling 52 at the other end is welded. In the alternative, both end couplings may be welded to the cylindrical portion 51, and then, after the annealing processing for removing the welding strain, the particle-shaped members 41 can be inserted through an opening which may be sealed. For this purpose, to the coupling at one end, a hole 5 which opens into the cylindrical portion 51 is provided. After the welding is completed, the particle-shaped members 41 are inserted through this hole 51g. After that, the rubber bushing 55 is inserted under pressure into the coupling 52 and mounted therein. In this manner, the hole 51g is closed.

With this construction, the annealing processing for removing the welding strain can be carried out. Further, since the hole 51g for inserting the particle-shaped members 41 is closed by the rubber bushing 55, it is unnecessary to provide a special member for closing the hole 51g. Further, while the height ofthe cylindrical portion 51 changes in three stages, it also may change linearly. With this construction, the welding work can be lessened.

With the above stated construction, the volume of the interior portion of the link 50 can be increased and the damping effect produced by the particle-shaped members 41 can be increased. Further, in comparison with the installation of a damping apparatus around the outside of the cylindrical portion, the possibility of the damping apparatus becoming dislodged and of the particle-shaped members 41 becoming scattered can be avoided.

Figure 18:
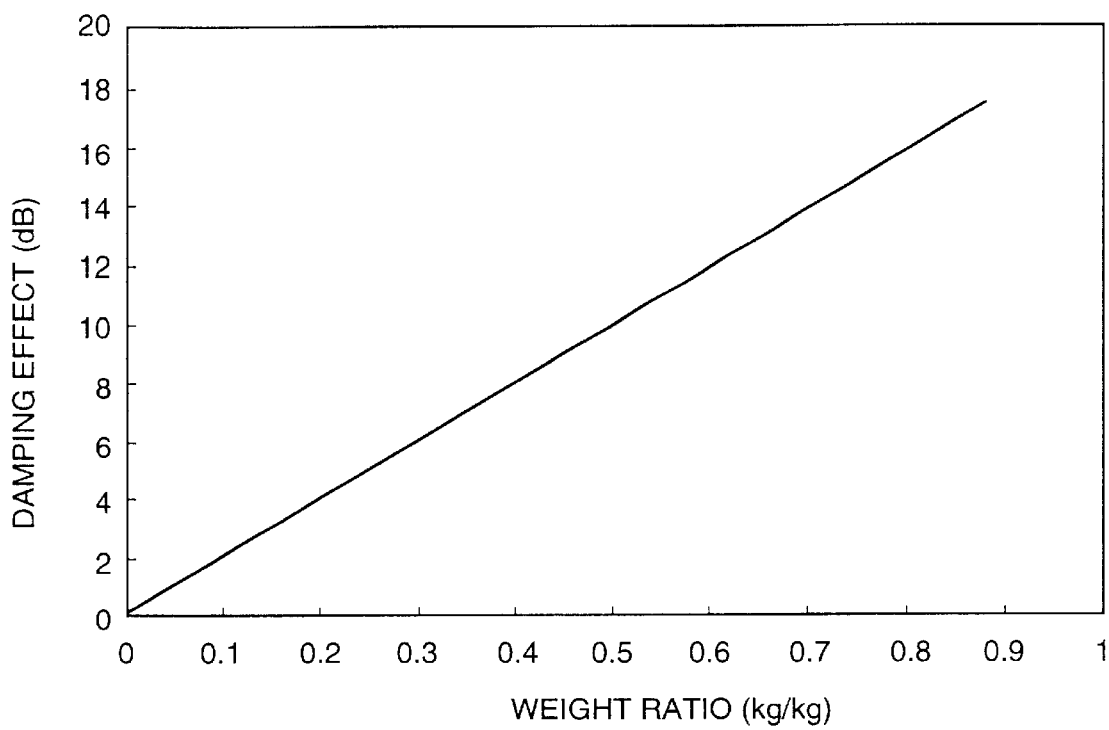
FIG. 18 is a graph in which a relationship between a damping effect and a mass is illustrated.

There are three types of the damping apparatus which may be installed, including the type in which the particle-shaped members are installed in a vessel disposed outside of the link, the type in which the particle-shaped members are installed inside of the link itself, and the type in which the particle-shaped members are installed both inside the link and in a vessel disposed outside of the link. In the above stated types, the damping effect relative to the weight ratio of the particle-shaped members with the link will be summarized with reference to the characteristics thereof as shown in FIG. 18. It can be understood that the damping effect has a linear relationship relative to the weight ratio. When the weight ratio of the particle-shaped members relative to the link is 50%, a damping effect of about 10 dB can be obtained.

It is preferable to mix particle-shaped members having plural shapes into one vessel. With this construction, in accordance with the increase of the weight ratio and the increase of the friction force, the damping effect can be improved. The shape in this case refers to the differences in the particle diameter and the appearance. It is unnecessary for the particles to have a spherical shape. For example, they may have a gourd shape, a multi-angular shape, and a shape having a recessed portion and a raised portion on a surface thereof When there is a recessed portion and a raised portion on the surface, the area of contact between the particle-shaped members increases, and the damping effect increases. The particle-shaped members having a recessed portion and a raised portion on the surface, for example, can be obtained by stirring the lead based spherical particle-shaped members using a blending machine.

From experimentation it has been determined that, the damping effect in a particle-shaped member of modified shape is larger than that of a spherical particle-shaped member. It is considered that the repulsion during collision of the particle-shaped members is small. Further, when the damping effect is based on the weight ratio, it is considered that the particle-shaped members 41 may be formed by a powder. The particle-shaped members also can be received in the interior portion of the pins 36 and 56.

Figure 19:
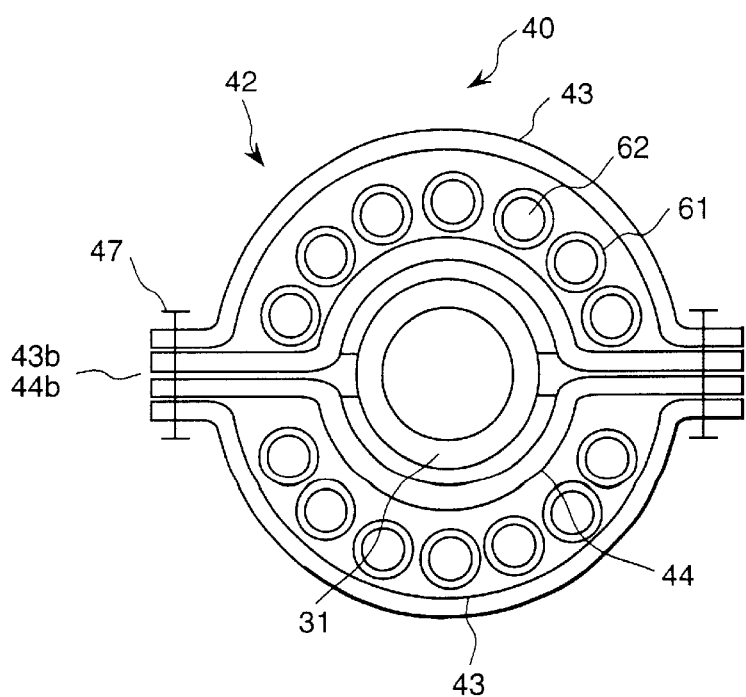
FIG. 19 is a cross-sectional view showing a damping apparatus of a further embodiment according to the present invention.
Figure 20:
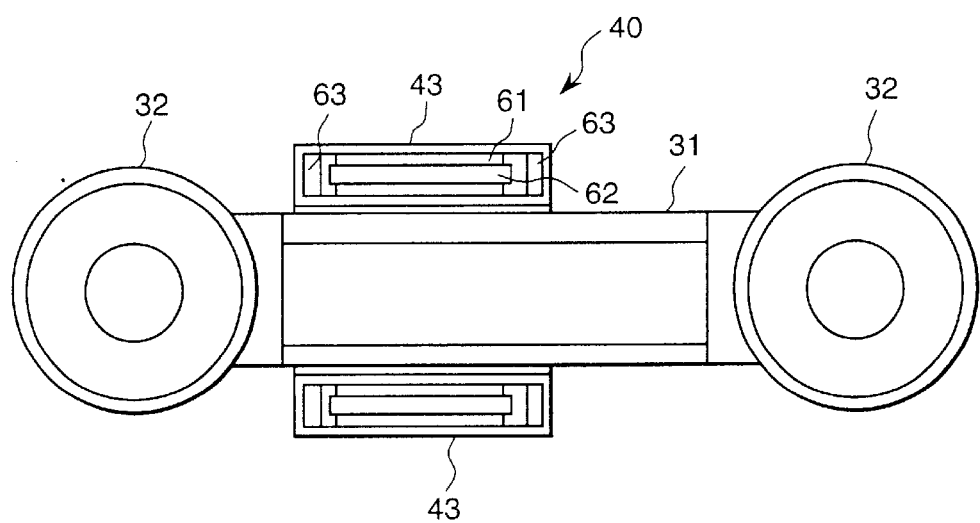
FIG. 20 is a longitudinal cross-sectional view of FIG. 19.

Embodiments shown in FIG. 19 and FIG. 20 will be explained. Between the inside plate 44 and the outside plate 43, there is provided a guide 61 having a plurality of holes, each accommodating a column 62, which can move along a hole of the guide 61. The guide 61 also can move. The guide 61 has a circular shape in cross-section and has plural holes extending in an axial direction. The plural holes are formed along a circumferential direction of the circular shape of the guide 61. Into the respective holes, the columns 62 are inserted. A seat 63 is fixed inside each end portion in the axial direction of the outside plate 43. The length of the guide 61 is similar to that of the column 62 and is a little shorter than the length between the respective seats 63, such that the guide 61 and the columns 62 collide with the seat 63 when they move. The damping effect is produced according to the friction resistance between the vessel 42 and the guide 61 and the chambers 62.

The columns 62 can be provided without the guide 6 1. The columns 62 can be divided in the axial direction. Further, the guide 61 and the columns 62 can be provided in the interior portion of the link 30. The length of the guide 61 can be shortened and the guide 61 can be removed.

Figure 21:
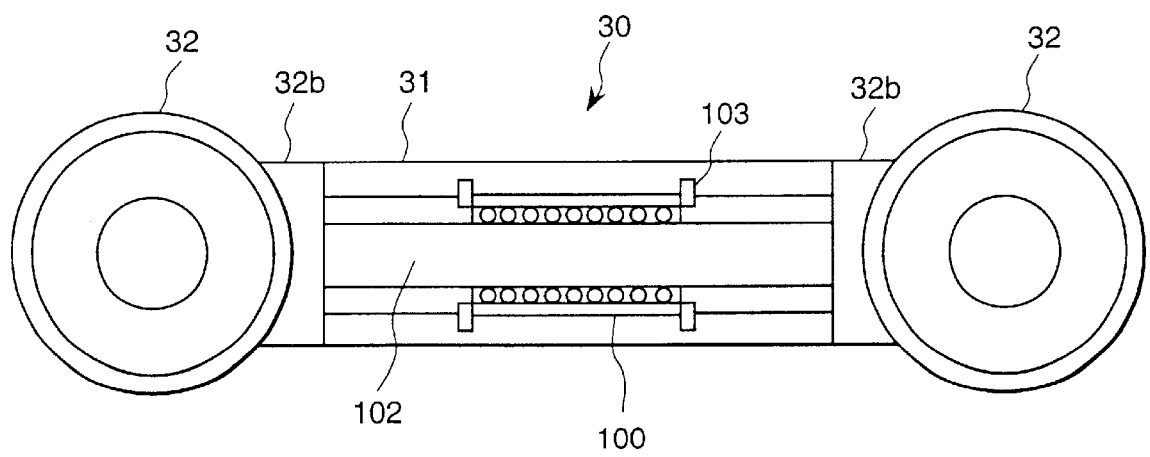
FIG. 21 is a longitudinal cross-sectional view showing a traction link of another embodiment according to the present invention.
Figure 22:
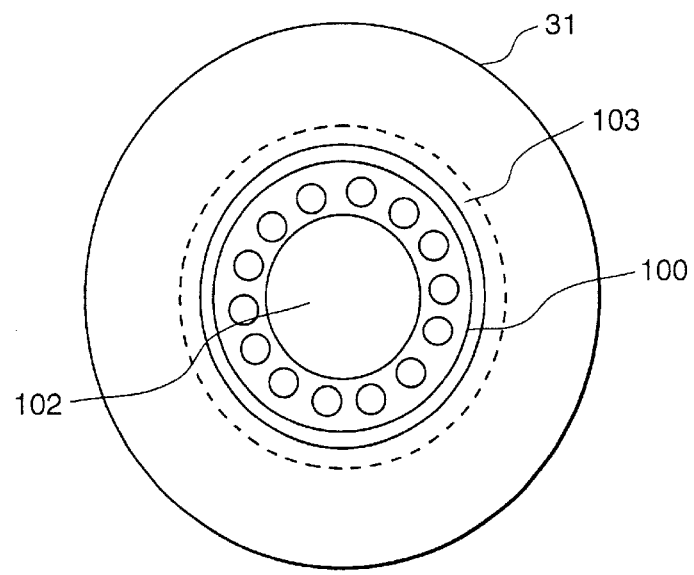
FIG. 22 is a central cross-sectional view of the traction link shown in FIG. 21.

An embodiment shown in FIG. 21 and FIG. 22 will be explained. In the interior portion of the cylindrical portion 31 of the link 30, a linear bushing 100 and a column 102 are arranged. The column 102 is supported through plural bearings in the interior portion of the linear bush 100 and can move smoothly in the axial direction. The linear bushing 100 is fixed to a central portion in the longitudinal direction of the cylindrical portion 31 through the snap ring 103. The length of the column 102 is longer than the length of the linear bushing 100. The respective ends of the column 32 approach an end face of the coupling 32b. The column 102 collides with the coupling 32b. The column 102 is made of iron and the diameter thereof is from 20 5 mm to 50 mm. Before the coupling 32b is welded to the cylindrical portion 31, the linear bushing 100, etc. are arranged thereon. The cylindrical portion 31, after the linear bushing 100 and the column 102 are assembled thereon, is welded to the respective end couplings 32b.

With the above-stated construction, the damping effect in the space resulting from a minute displacement (a comparatively high frequency of more than 100 Hz) can be obtained (the effect is low a little). Further, the impact vibration component in the low frequency from 0.1 Hz to 50 Hz which is generated in the forward and backward directions during the running can be absorbed.

Further, plural bolts which penetrate into the cylinder from the outside in a radial direction of the cylindrical portion 31 are provided, and with these bolts, the linear bushing 100 in the interior portion is pressed and fixed. Further, the linear bushing 100 is elongated and the column 102 can be divided into plural sections in the axial direction. In the column 102, the particle-shaped members can be inserted. With this construction, the above-stated effects can be obtained.

Figure 23:
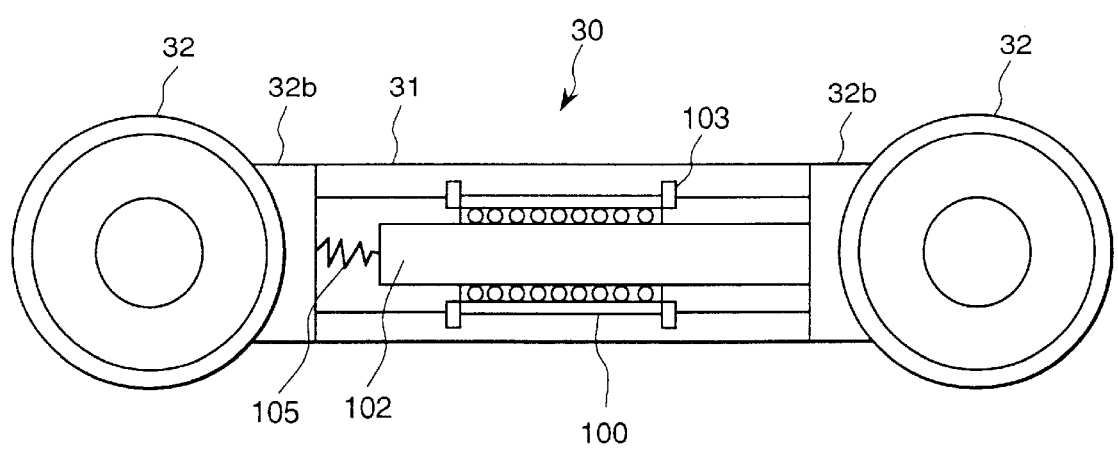
FIG. 23 is a longitudinal cross-sectional view showing a traction link of another embodiment according to the present invention.

An embodiment shown in FIG. 23 will be explained. At one end of the column 102, a coil spring member 105 is installed. The coil spring member 105 bears against the coupling 32b and one end of the column 102. The other end of the column 102 contacts the end face of the other end coupling 32b. With this construction, contact can always be maintained between the column 102 and the coupling 32b, and damping of the minute vibration component can be maintained. Further, since a specific vibration frequency which is determined by the spring constant of the coil 105 and the mass of the column 102 can be established suitably, a dynamo-absorbing action can be expected.

Figure 24:
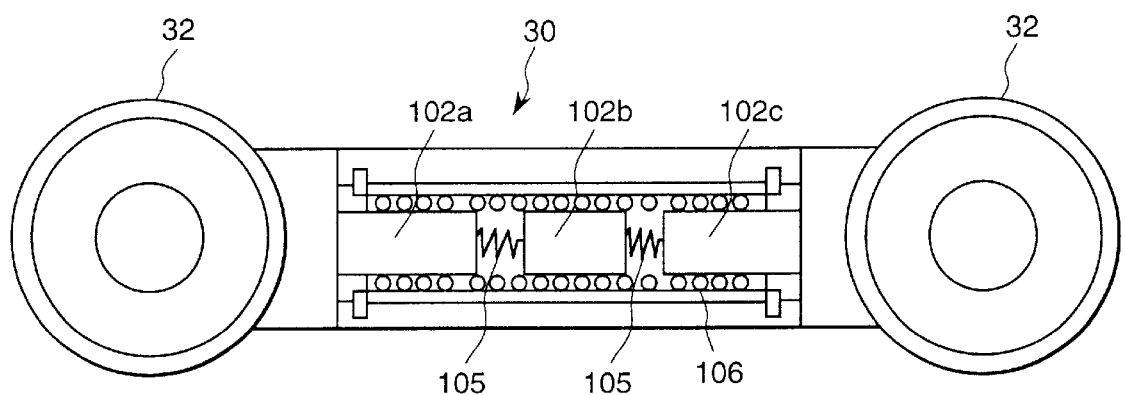
FIG. 24 is a longitudinal cross-sectional view showing a traction link of another embodiment according to the present invention.

An embodiment shown in FIG. 24 will be explained. The column 102 is divided into three sections in the axial direction and at both ends of a central column 102b, a coil spring member 105 is provided. The coil spring member 105 bears against the adjacent columns 102a and 102c. The columns 102a and 102c contact the faces of the respective end couplings 32b.

Figure 25:
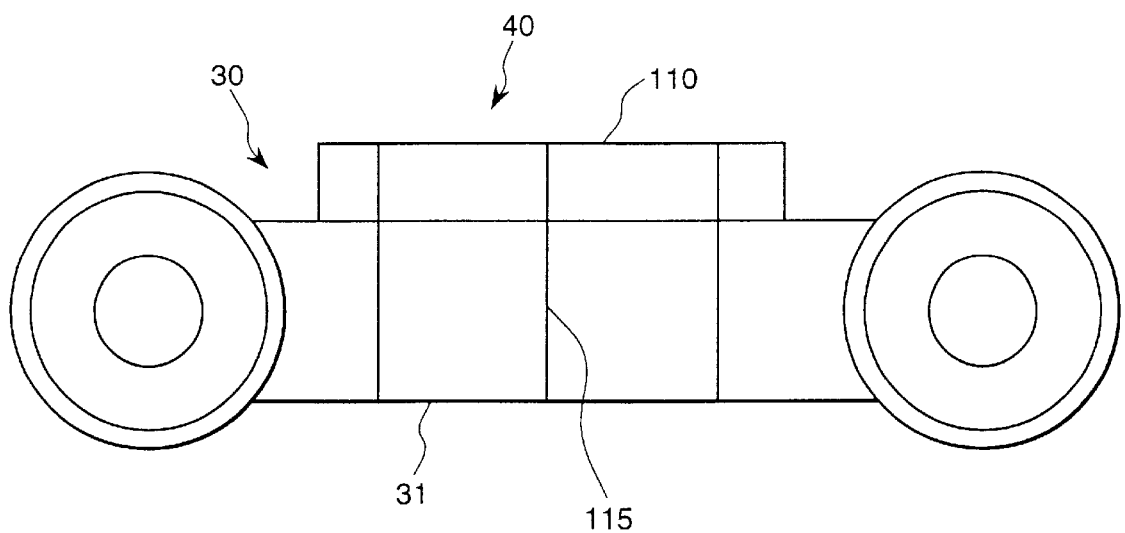
FIG. 25 is a side view showing a traction link of another embodiment according to the present invention.

An embodiment shown in FIG. 25 will be explained. In FIG. 25, the particle-shaped members are inserted into the interior portion of a pipe 110 or a column or a linear bushing is inserted therein. Both ends of the pipe 110 are closed. This pipe 110 is fixed to the outer face of the link 30 using plural bands 115. Also, plural pipes 110 can be installed along the circumference of the cylindrical portion 31.

In the above description, the adoption of a one link system traction link has been explained, however, it is possible adopt to another type of traction link, for example Z system link. Further, to the outside portion of the yaw damper 28 or to the outside portion of the right and left damper, with a damping apparatus installed, a damping effect having an equal grade can be obtained. Further, the installation of a shaft damper, which connects to the car body and the bogie car in the upper and lower direction at the outside portion can result in a similar effect. Further, a bolster anchor can be provided in a bogie car having a bolster.

An embodiment shown in FIG. 26 will be explained. The link 30 has a cylindrical shape, and particle-shaped members are enclosed in the interior portion between the end portions 32b of the shaft coupling. The particle-shaped members 41 are made of a ferro based material. For example, iron (SS 400) may be used, and the particle diameter is 1 mm–10 mm. The fill-up density of the particle-shaped members 41 is 50%. At respective ends of the cylindrical portion 31, the couplings 32b are welded after the particle-shaped members 41 have inserted into the hollow cylindrical portion 31. Other features are similar to those of the embodiment shown in FIG. 1.

To lubricate and prevent corrosion of the particle-shaped members 41 in the link, a lubricating material or oil etc. can be enclosed with the particles. Since a diameter of the particle-shaped members 41 is changed in response to the frequency of the insulation material (for a high frequency, the particle diameter is made small), a reduction effect at a minute vibration can be obtained. Further, particle-shaped members having different particle diameters and a different specific gravity can be mixed into particles enclosed in the interior portion of the link.

Further, by enclosing the particle-shaped members, the specific vibration of the link 30, which is determined by the spring member and the mass, can be adjusted to a suitable value. Since the particle-shaped members are enclosed in the interior portion of the traction link, the problem of corrosion disappears.

As to the rubber bush 35, when a material having a similar characteristic to that used in the prior art is used, the running stability according to the prior art can be secured and the restraint of the vibration in which the rotation component of 80–240 Hz, which is caused by an unbalance of the bogie car drive system, solid-propagates, and the reduction of the noise in the car which such noise is generated can be improved.

The cylindrical portion 31 can be divided into two sections in the longitudinal direction, and both cylindrical portions are combined with flanges which are provided at both ends of the two sections. With this construction, after the welding of the flange, the strain removing process applied to the link 30 can be carried out by annealing. After that, the particle-shaped members are inserted, and the flange is fastened using the bolt-nut fastener.

Figure 27:
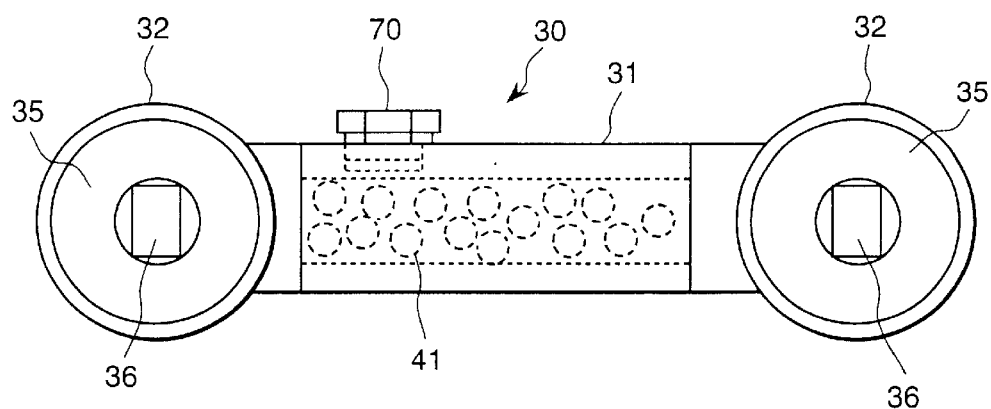
FIG. 27 is a side view showing a traction link of another embodiment according to the present invention.

An embodiment shown in FIG. 27 will be explained. At a side face of the cylindrical portion 31 of the link 30, an insertion hole which makes it possible to insert or take out the particle-shaped members is provided. The reference numeral 70 indicates a screw-in cover.

With the construction described above, after the link 30 has been installed to the car body side or the bogie car side, the particle-shaped members can be inserted easily. Further, even with the scattering of the characteristic between the cars, it is possible to perform an optimization of the particle-shaped members 41, and to carry out a minute adjustment thereof. Further, when replacement of the particle-shaped members is required, the exchange can be carried out easily.

Embodiments shown in FIG. 28 and FIG. 29 will be explained. A damping apparatus 71, in which the particle-shaped members 41 are enclosed, is secured to the outer face of the cylindrical portion 31 of the link 30 through bolts 72b.

With the construction described above, the damping apparatus 71 can be removed easily, so that it is possible to replace the apparatus. Further, it is possible to easily employ the optimum arrangement of the damping apparatus 71.

An embodiment shown in FIG. 30 will be explained. The interior portion of the cylindrical portion 31 of the link 30 is divided at the right and the left sides, and in the cylindrical portion at one end, particle-shaped members 41a having the large diameter size are enclosed, while in the cylindrical portion at the other end particle-shaped members 41b having a small diameter size are enclosed.

With the construction described above, it is possible to arrange the particle-shaped members 41a which correspond to one time component of the rotation frequency component of the drive system unbalance and the particle-shaped members 41b which correspond to two times the component.

An embodiment shown in FIG. 31 will be explained. The interior portion of the cylindrical portion 31 of the link 30 which encloses the particle-shaped members are divided into three layers by plates 73b and 73c, and in the interior portion, the particle-shaped members 41a, 41b, and 41c having respectively different characteristics are enclosed. For example, the particle-shaped members 41a, 41b, and 41c have particle diameters which correspond respectively to the component, to two times the component, and to three times the component of fl. Accordingly, the minute vibration restraint can be carried out.

Figure 28:
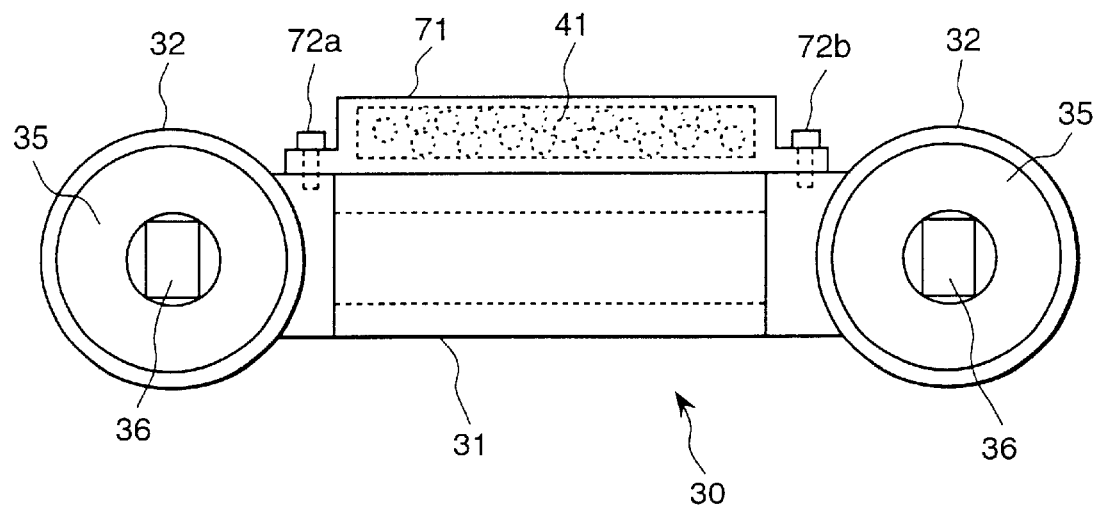
FIG. 28 is a side view showing a traction link of another embodiment according to the present invention.
Figure 29:
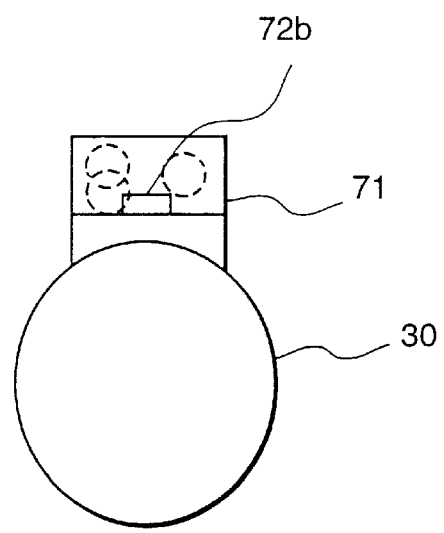
FIG. 29 is a central cross-sectional view of FIG. 28.
Figure 30:
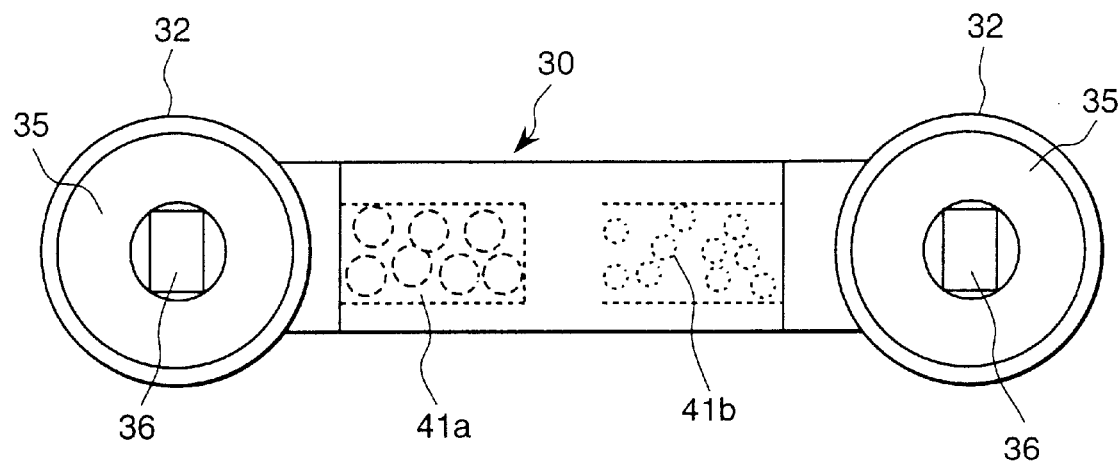
FIG. 30 is a side view showing a traction link of a further embodiment according to the present invention.
Figure 31:
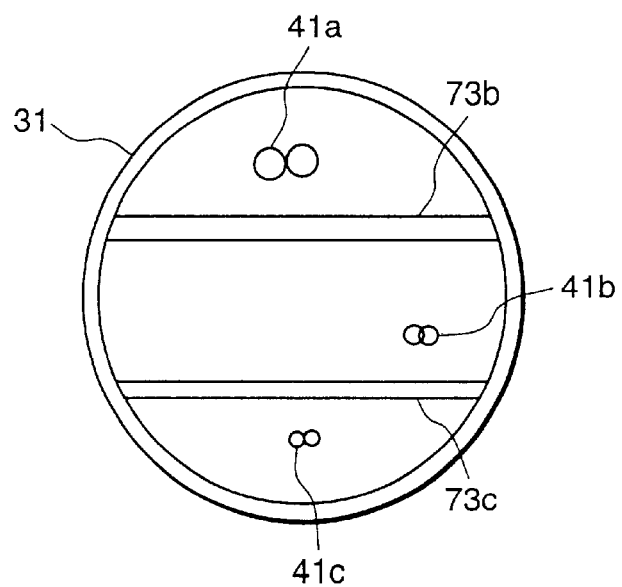
FIG. 31 is a central cross-sectional view showing a traction link of a further embodiment according to the present invention.

When the features shown in FIG. 30 or FIG. 31 are applied to the embodiments shown in FIG. 28 and FIG. 29, plural apparatus 71, 71, . . . having respectively different characteristics are installed on the outer periphery of the cylindrical portion 31 of the link 30.

Figure 26:
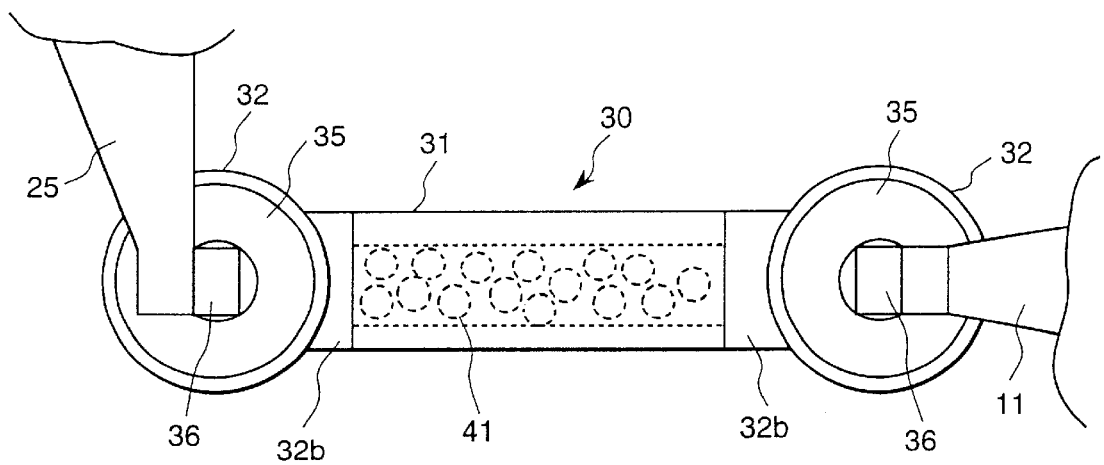
FIG. 26 is a side view showing a traction link of another embodiment according to the present invention.

In FIG. 26, in the interior portions of the pins 36, the particle-shaped members can be inserted. With this construction, the vibration can be retrained by these portions.

Figure 32:
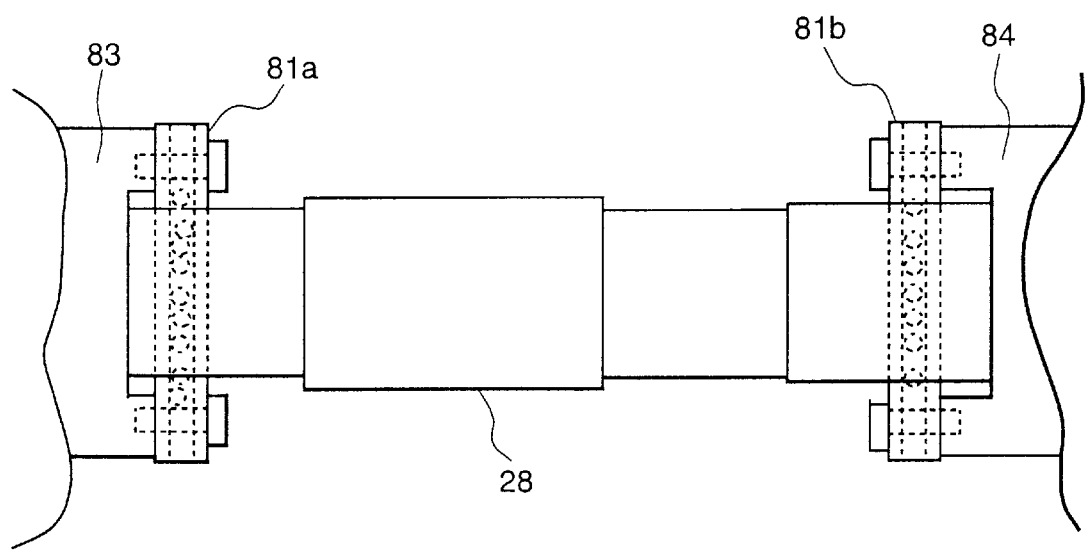
FIG. 32 is a top plan view showing a yaw damper portion of a further embodiment according to the present invention.

A case in which a damping apparatus using particle-shaped members in a yaw damper 28 will be explained with reference to FIG. 32. Through pins 81a and 81b which penetrate the rubber bush of the yaw damper 28, the damping apparatus is bolted to the installation portions 83 and 84 of the bogie car and the car body. In the interior portions of the pins 81a and 81b, the particle-shaped members are enclosed. The diameters of the particle-shaped members enclosed in the pins 81a and 81b have different sizes.

Further, between the bogie car and the car body, in addition to the above, a right and left damper are employed on the apparatus. In this damper, such as a yaw damper, the particle-shaped members are enclosed in the pin of the connection portion between the damper and the bogie car and the car body.

The technical range of the present invention is not limited to the description provided herein or to the specific embodiments as descended and illustrated or the disclosed means for solving the problems of the prior art, but includes a range of equivalents which would be known to the man skilled in the technique field to which the present invention is applied.

According to the present invention, with a simple construction in which a substance is provided movably in a connection member for connecting parts of a car body and a connection member for connecting a bogie car and a car body, the transmission of a vibration which is generated from the drive system can be restrained, with a result that the noise in the car can be reduced.

What is claimed is:

1. A railway vehicle, wherein
    a traction link between one part of a car body and a bogie car frame has a hollow portion which contains a substance which is able to move relative to said traction link so as to absorb vibration and thereby hinder vibration transmission to the car body, said substance having a specific gravity at least as high as that of iron.
2. A railway vehicle according to claim 1, wherein
    said hollow portion contains a substance which is able to move in a forward and backward direction relative to the direction of movement of the railway vehicle.

3. A railway vehicle according to claim 1, wherein
said substance comprises plural particle-shaped members and said hollow portion contains said particle-shaped members in contact with each other.

4. A railway vehicle according to claim 3, wherein
said particle-shaped members have a specific gravity larger than that of a ferro system.

5. A railway vehicle according to claim 4, wherein
plural kinds of particle-shaped members having different shapes are provided.

6. A railway vehicle according to claim 1, wherein
said traction link connects a second connection member which projects at a lower portion from said car body and said bogie car frame.

7. A railway vehicle according to claim 6, wherein
said hollow shape is constituted using a cylindrical portion between both ends of said traction link, and into said cylindrical portion said substance is inserted.

8. A railway vehicle according to claim 7, wherein
said traction link has an elliptical shape in which a longitudinal direction is longer than the lateral direction, a height of said ellipse of said traction link at a side of said second connection member is smaller than the height of said ellipse of said traction link at a side of said bogie car frame.

9. A railway vehicle according to claim 7 or claim 8, wherein
said substance is in the form of particle-shaped members.

10. A railway vehicle according to claim 9, wherein
at both ends of said cylindrical portion, couplings for connecting said bogie car frame and said second connection member are provided, at at least one of said couplings there is a hole opening into said cylindrical portion, and said hole is closed using a rubber bush which is arranged in said coupling.

11. A railway vehicle according to claim 1, wherein
said hollow portion is installed on an outside portion of said traction link.

12. A railway vehicle according to claim 11, wherein
a rubber seat is provided between said hollow portion and said traction link.

13. A railway vehicle having a bogie car, wherein
the bogie car comprises a traction link connection member connected to a car body, said traction link having a hollow portion in which a movable substance is provided, said substance being able to move relative to said traction link so as to absorb vibration and thereby hinder vibration transmission to the car body, said substance having a specific gravity at least as high as that of iron.

14. A railway vehicle according to claim 13, wherein
said hollow portion contains a substance which is able to move in a forward and backward direction relative to the direction of movement of the railway vehicle.

15. A railway vehicle according to claim 13, wherein
said substance comprises plural particle-shaped members and said hollow portion contains said particle-shaped members which contact each other.

16. A railway vehicle according to claim 15, wherein
said particle-shaped members have a specific gravity larger than that of a ferro system.

17. A railway vehicle according to claim 16, wherein
plural kinds of particle-shaped members having different shapes are provided.

18. A railway vehicle according to claim 13, wherein
said traction link connects a second connection member which projects at a lower portion from said car body and said bogie car frame.

19. A railway vehicle according to claim 18, wherein
said hollow shape is constituted using a cylindrical portion between both ends of said traction link, and into said cylindrical portion said substance is inserted.

20. A railway vehicle according to claim 19, wherein
said traction link has an elliptical shape in which a longitudinal direction is longer than a lateral direction, a height dimension of said ellipse of said traction link at a side of said second connection member is smaller than the height of said ellipse of said traction link as a side of said bogie car frame.

21. A railway vehicle according to claim 19 or 20, wherein
said substance is in the form of particle-shaped members.

22. A railway vehicle according to claim 21, wherein
at both ends of said cylindrical portion, couplings for connecting said bogie car frame and said second connection member are provided, at at least one of said couplings there is a hole opening into said cylindrical portion, and said hole is closed using a rubber bush which is arranged in said coupling.

23. A railway vehicle according to claim 13, wherein
said hollow portion is installed on an outside portion of said connection member.

24. A railway vehicle according to claim 13, wherein
a rubber seat is provided between said hollow portion and said traction link.

25. A traction link connecting a second connection member which projects at a lower portion from a car body and a bogie car frame, wherein
said traction link is formed with a hollow portion comprising a cylindrical portion between both ends of said traction link, and a substance provided on the hollow portion, the substance being able to move relative to said traction link so as to absorb vibration and thereby hinder vibration transmission to the car body, said substance having a specific gravity at least as high as that of iron, wherein into said cylindrical portion said substance is inserted.

26. A connection member according to claim 25, wherein
said substance comprises plural particle-shaped members and said hollow portion contains said particle-shaped members which contact each other.

27. A connection member according to claim 25, wherein
said particle-shaped members have a specific gravity larger than that of a ferro system.

28. A connection member according to claim 25, wherein
plural kinds of particle-shaped members having different shapes are provided.

29. A connection member according to claim 25, wherein
said traction link has an elliptical shape in which a longitudinal direction is longer than the lateral direction, a height of said ellipse of said traction link at a side of said second connection member is smaller than the height of said ellipse of said traction link at a side of said bogie car frame.

30. A connection member according to claim 25 or claim 29, wherein
said substance is in the form of particle-shaped members.

31. A connection member according to claim 30, wherein
at both ends of said cylindrical portion, couplings for connecting said bogie car frame and said second connection member are provided, at at least one of said couplings there is a hole opening into said cylindrical portion, and said hole is closed using a rubber bush which is arranged in said coupling.

* * * * *